W. EATON & J. A. RANDALL.
MILK-COOLER.
No. 179,286.  Patented June 27, 1876.
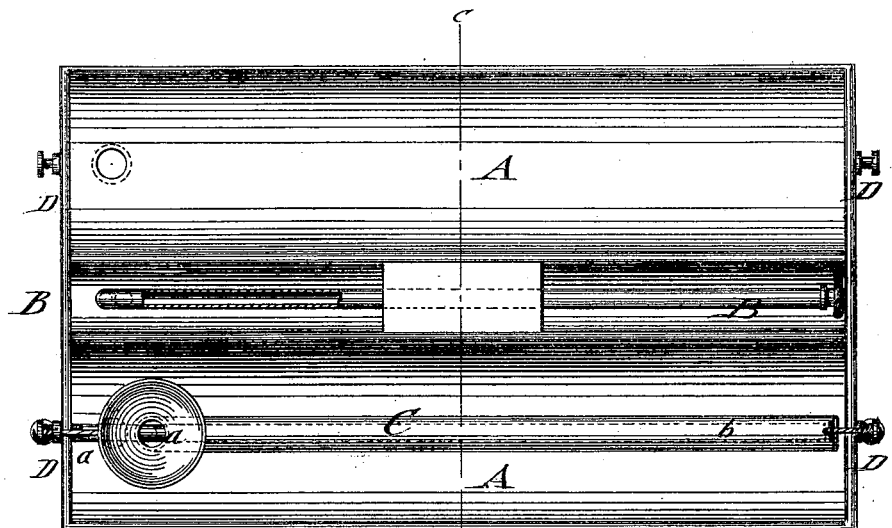
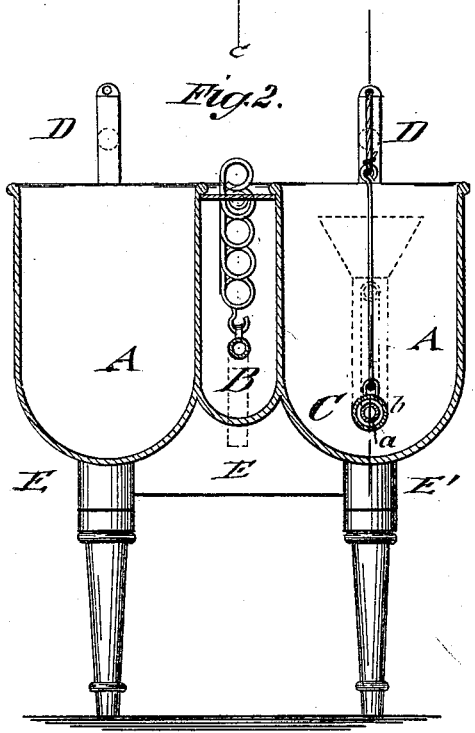

UNITED STATES PATENT OFFICE.

WILLIAM EATON AND JOHN A. RANDALL, OF NORWICH, NEW YORK.

IMPROVEMENT IN MILK-COOLERS.

Specification forming part of Letters Patent No. 179,286, dated June 27, 1876; application filed January 29, 1876.

*To all whom it may concern:*

Be it known that we, WILLIAM EATON, of Norwich, in the county of Chenango and State of New York, and JOHN A. RANDALL, of same place, have invented a new and Improved Milk-Cooler, of which the following is a specification:

In the accompanying drawing, Figure 1 represents a top view of our improved milk-cooler; Fig. 2, a vertical transverse section of the same on line $c\ c$, Fig. 1.

Similar letters of reference indicate corresponding parts.

Our invention relates to a milk-pan with improved cooling devices, by which the cooling is accomplished in a reliable and superior manner.

In the drawing, A represents a round-bottomed milk-pan, in two separate sections, as shown in Fig. 2. The cooler B is arranged stationary in the milk-pan, extending centrally in longitudinal direction through the same, and being provided, in the usual manner, with water supply and exit pipes, and suitable means to regulate the height of the water by suitable overflows.

The round-bottomed pan or pans are provided directly with lateral fixed supports or stands E, having sockets for legs, so as to do away with the separate frames, racks, tables, &c., and furnish thereby a cheaper and firmer support, that is not liable to shake, completing the pan, and admitting the ready and convenient shipping and setting up of the same.

The stationary cooler serves fully to cool the milk at ordinary temperature, while the movable cooler allows the quicker cooling at higher temperature, and gives also full control of the milk without being in the way of skimming or cleaning.

Having thus described our invention, we claim as new and desire to secure by Letters Patent—

A double milk-pan, consisting of two milk-compartments, separated by an intermediate cooling-chamber, extended longitudinally between them, as shown and described.

WILLIAM EATON.
J. A. RANDALL.

Witnesses:
S. O. FIELD,
ALBERT CARY.